United States Patent
Cox et al.

(10) Patent No.: US 10,031,916 B2
(45) Date of Patent: Jul. 24, 2018

(54) METHODS AND SYSTEMS FOR VIRTUALIZING AND MANAGING CLOUD STORAGE SOURCES

(71) Applicants: Claude Lano Cox, Austin, TX (US); Liam B. Quinn, Austin, TX (US); Mark W. Welker, Austin, TX (US); Rocco Ancona, Austin, TX (US)

(72) Inventors: Claude Lano Cox, Austin, TX (US); Liam B. Quinn, Austin, TX (US); Mark W. Welker, Austin, TX (US); Rocco Ancona, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 211 days.

(21) Appl. No.: 14/308,404

(22) Filed: Jun. 18, 2014

(65) Prior Publication Data

US 2015/0373109 A1 Dec. 24, 2015

(51) Int. Cl.
*G06F 17/30* (2006.01)
*H04L 29/08* (2006.01)

(52) U.S. Cl.
CPC .... *G06F 17/30082* (2013.01); *H04L 67/1012* (2013.01); *H04L 67/1097* (2013.01); *G06F 17/30221* (2013.01)

(58) Field of Classification Search
None
See application file for complete search history.

(56) References Cited

U.S. PATENT DOCUMENTS

| | | | |
|---|---|---|---|
| 6,742,037 B1 | 5/2004 | Hall | |
| 7,062,515 B1 | 6/2006 | Thomas | |
| 7,761,414 B2 | 7/2010 | Freedman | |
| 8,473,466 B1 * | 6/2013 | Milby | G06F 17/30306 707/694 |
| 8,590,050 B2 * | 11/2013 | Nagpal | G06F 21/6218 713/164 |
| 8,682,851 B2 | 3/2014 | Weber | |
| 8,782,236 B1 | 7/2014 | Marshall | |
| 2004/0024796 A1 * | 2/2004 | Takeda | G06F 11/008 |
| 2007/0083575 A1 * | 4/2007 | Leung | G06F 17/30082 |
| 2008/0007765 A1 * | 1/2008 | Ogata | G06F 9/4843 358/1.15 |
| 2012/0158799 A1 * | 6/2012 | Morsi | G06F 17/30289 707/812 |
| 2012/0303585 A1 * | 11/2012 | Zuckerman | G06F 17/30088 707/649 |
| 2012/0310880 A1 * | 12/2012 | Giampaolo | G06F 17/30545 707/610 |
| 2013/0191339 A1 | 7/2013 | Haden | |
| 2013/0204849 A1 | 8/2013 | Chacko | |

(Continued)

*Primary Examiner* — Richard Bowen
(74) *Attorney, Agent, or Firm* — Baker Botts L.L.P.

(57) ABSTRACT

Methods and systems for virtualizing and managing cloud storage sources are disclosed. The method includes detecting devices in communication with a docking station and identifying a file on one of the devices. The method also includes identifying a plurality of cloud storage sources and calculating a weighted value for each storage source among the plurality of storage sources. The method further includes selecting a storage location within the plurality of cloud storage sources based on the calculated weighted values and storing the file at the selected storage location.

18 Claims, 4 Drawing Sheets

(56) References Cited

U.S. PATENT DOCUMENTS

| | | | |
|---|---|---|---|
| 2013/0291121 A1* | 10/2013 | Iovanov | G06F 9/541 726/28 |
| 2013/0297844 A1* | 11/2013 | Rosenberg | G06F 1/1632 710/303 |
| 2013/0304904 A1* | 11/2013 | Mouline | H04L 43/045 709/224 |
| 2014/0136782 A1* | 5/2014 | Thomas | G06F 17/30115 711/117 |
| 2014/0143791 A1 | 5/2014 | Mark | |
| 2014/0181198 A1 | 6/2014 | Motes | |
| 2015/0088940 A1* | 3/2015 | Stokely | G06F 17/30194 707/827 |
| 2015/0178007 A1* | 6/2015 | Moisa | G06F 17/30112 713/190 |
| 2015/0370612 A1 | 12/2015 | Cox | |
| 2015/0373101 A1 | 12/2015 | Cox | |

* cited by examiner

METHODS AND SYSTEMS FOR VIRTUALIZING AND MANAGING CLOUD STORAGE SOURCES

TECHNICAL FIELD

This disclosure relates generally to information handling systems and more particularly to methods and systems for virtualizing and managing cloud storage sources.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In accordance with some embodiments of the present disclosure, a method for virtualizing and managing cloud storage sources includes detecting devices in communication with a docking station and identifying a file on one of the devices. The method also includes identifying a plurality of cloud storage sources and calculating a weighted value for each storage source among the plurality of storage sources. The method further includes selecting a storage location within the plurality of cloud storage sources based on the calculated weighted values and storing the file at the selected storage location.

In accordance with some embodiments of the present disclosure, a non-transitory computer readable medium includes computer readable instructions which, when executed, cause a processor to detect devices in communication with a docking station and identify a file on one of the devices. The instructions also cause the processor to identify a plurality of cloud storage sources and calculate a weighted value for each storage source among the plurality of storage sources. The instructions further cause the processor to select a storage location within the plurality of cloud storage sources based on the calculated weighted values and store the file at the selected storage location.

In accordance with some embodiments of the present disclosure, an information handling system includes a processor, a memory communicatively coupled to the processor, a docking station, and a cloud storage configuration module. The cloud storage configuration module includes computer readable instructions which, when executed, cause the processor to detect devices in communication with a docking station and identify a file on one of the devices. The instructions also cause the processor to identify a plurality of cloud storage sources and calculate a weighted value for each storage source among the plurality of storage sources. The instructions further cause the processor to select a storage location within the plurality of cloud storage sources based on the calculated weighted values and store the file at the selected storage location.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

In the following description, details are set forth by way of example to facilitate discussion of the disclosed subject matter. It should be apparent to a person of ordinary skill in the field, however, that the disclosed embodiments are exemplary and not exhaustive of all possible embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, entertainment, or other purposes. For example, an information handling system may be a personal computer (e.g., desktop or laptop), tablet computer, mobile device (e.g., personal digital assistant (PDA) or smart phone), server (e.g., blade server or rack server), a consumer electronic device, a network storage device, or another suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more storage devices, one or more communications ports (e.g., network ports) for communicating with external devices as well as various input and output (I/O) devices, such as a keyboard, a mouse, a touchscreen and/or a video display. The information handling system may also include one or more buses operable to transmit communication between the various hardware components.

For the purposes of this disclosure, a computer-readable non-transitory storage medium or media may include, without limitation, one or more semiconductor-based or other integrated circuits (ICs) (such as, for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

As will be described in further detail, the inventors of the present disclosure have discovered methods and systems for virtualizing and managing cloud storage sources. The methods and systems accumulate the cloud storage sources available to the user of an information handling system and presents those sources as a single manageable entity. In some embodiments, files that the user desires to store in the cloud are automatically allocated to one of the cloud storage sources based on a weighted value calculated from a variety of factors including the availability of the cloud storage source, the available space on that cloud storage source, transmission speeds and latencies, the size and type of the file, security requirements, or other appropriate factors. The methods and systems also provide dynamic load balancing across the cloud storage sources.

Particular embodiments are best understood by reference to FIGS. 1-4 wherein like numbers are used to indicate like and corresponding parts.

Figure 1:
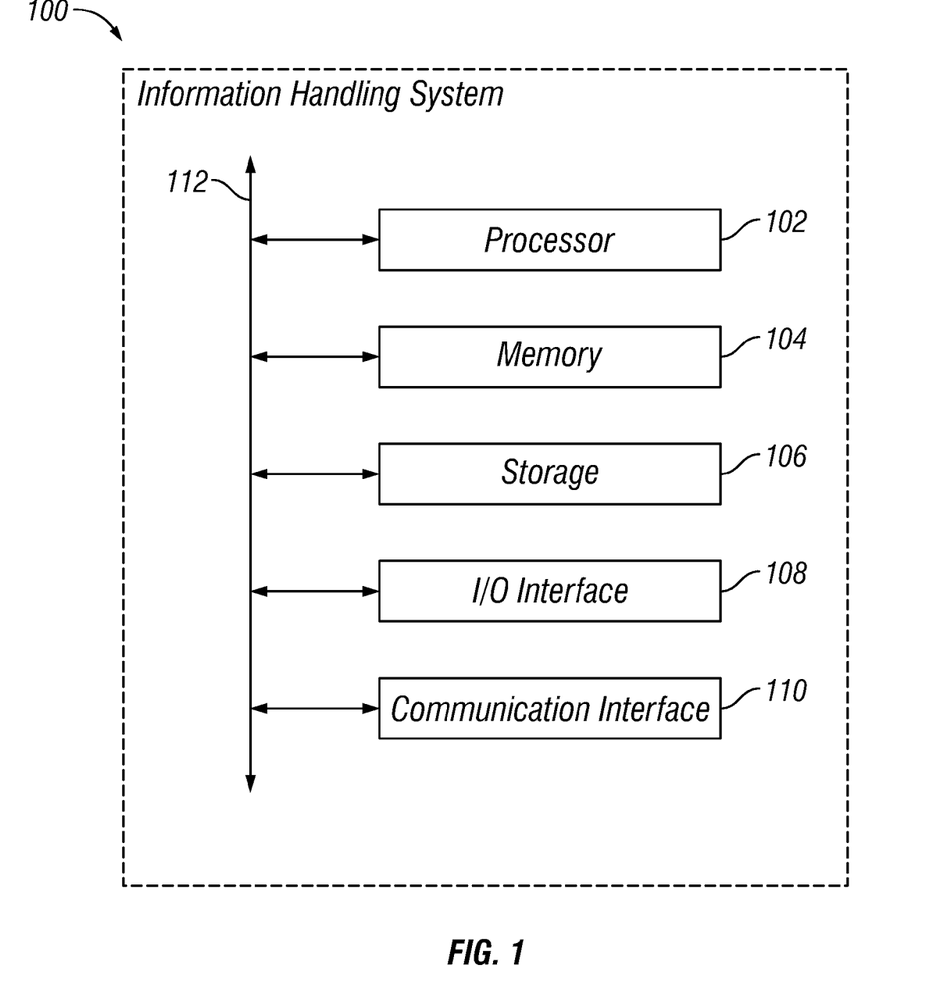
FIG. 1 illustrates a block diagram of selected elements of an embodiment of an information handling system, in accordance with some embodiments of the present disclosure.

FIG. 1 is a block diagram of selected elements of an embodiment of information handling system 100, in accordance with some embodiments of the present disclosure. In particular embodiments, one or more information handling systems 100 perform one or more steps of one or more methods described or illustrated herein. In particular embodiments, one or more information handling systems 100 provide the functionality described or illustrated herein. In particular embodiments, software running on one or more information handling systems 100 performs one or more steps of one or more methods described or illustrated herein or provides functionality described or illustrated herein. Particular embodiments include one or more portions of one or more information handling systems 100. Herein, reference to an information handling system may encompass a computing device, and vice versa, where appropriate. Moreover, reference to an information handling system may encompass one or more information handling systems, where appropriate.

This disclosure contemplates any suitable number of information handling systems 100. This disclosure contemplates information handling system 100 taking any suitable physical form. As an example and not by way of limitation, information handling system 100 may be an embedded information handling system, a system-on-chip (SOC), a single-board information handling system (SBC) (such as, for example, a computer-on-module (COM) or system-on-module (SOM)), a desktop information handling system, a laptop or notebook information handling system, an interactive kiosk, a mainframe, a mesh of information handling systems, a mobile telephone, a personal digital assistant (PDA), a server, a tablet information handling system, or a combination of two or more of these. Where appropriate, information handling system 100 may include one or more information handling systems 100, be unitary or distributed, span multiple locations, span multiple machines, span multiple data centers, or reside in a cloud, which may include one or more cloud components in one or more networks. Where appropriate, one or more information handling systems 100 may perform without substantial spatial or temporal limitation one or more steps of one or more methods described or illustrated herein. As an example and not by way of limitation, one or more information handling systems 100 may perform in real time or in batch mode one or more steps of one or more methods described or illustrated herein. One or more information handling systems 100 may perform at different times or at different locations one or more steps of one or more methods described or illustrated herein, where appropriate.

In particular embodiments, information handling system 100 includes processor 102, memory 104, storage 106, input/output (I/O) interface 108, communication interface 110, and bus 112. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 102 includes hardware for executing instructions, such as those making up a computer program. As an example and not by way of limitation, to execute instructions, processor 102 may retrieve (or fetch) the instructions from an internal register, an internal cache, memory 104, or storage 106; decode and execute them; and then write one or more results to an internal register, an internal cache, memory 104, or storage 106. In particular embodiments, processor 102 may include one or more internal caches for data, instructions, or addresses. This disclosure contemplates processor 102 including any suitable number of any suitable internal caches, where appropriate. As an example and not by way of limitation, processor 102 may include one or more instruction caches, one or more data caches, and one or more translation lookaside buffers (TLBs). Instructions in the instruction caches may be copies of instructions in memory 104 or storage 106, and the instruction caches may speed up retrieval of those instructions by processor 102. Data in the data caches may be copies of data in memory 104 or storage 106 for instructions executing at processor 102 to operate on; the results of previous instructions executed at processor 102 for access by subsequent instructions executing at processor 102 or for writing to memory 104 or storage 106; or other suitable data. The data caches may speed up read or write operations by processor 102. The TLBs may speed up virtual-address translation for processor 102. In particular embodiments, processor 102 may include one or more internal registers for data, instructions, or addresses. This disclosure contemplates processor 102 including any suitable number of any suitable internal registers, where appropriate. Where appropriate, processor 102 may include one or more arithmetic logic units (ALUs); be a multi-core processor; or include one or more processors 102. Although this disclosure describes and illustrates a particular processor, this disclosure contemplates any suitable processor.

In particular embodiments, memory 104 includes main memory for storing instructions for processor 102 to execute or data for processor 102 to operate on. As an example and not by way of limitation, information handling system 100 may load instructions from storage 106 or another source (such as, for example, another information handling system 100) to memory 104. Processor 102 may then load the instructions from memory 104 to an internal register or internal cache. To execute the instructions, processor 102 may retrieve the instructions from the internal register or internal cache and decode them. During or after execution of the instructions, processor 102 may write one or more results (which may be intermediate or final results) to the internal register or internal cache. Processor 102 may then write one or more of those results to memory 104. In particular embodiments, processor 102 executes only instructions in one or more internal registers or internal caches or in memory 104 (as opposed to storage 106 or elsewhere) and operates only on data in one or more internal registers or internal caches or in memory 104 (as opposed to storage 106 or elsewhere). One or more memory buses (which may each include an address bus and a data bus) may couple processor 102 to memory 104. Bus 112 may include one or more memory buses, as described below. In particular embodiments, one or more memory management units (MMUs) reside between processor 102 and memory 104 and facilitate access to memory 104 requested by processor 102. In particular embodiments, memory 104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 104 may include one or more memories 104, where appropriate. Although this disclosure describes and illustrates particular memory, this disclosure contemplates any suitable memory.

In particular embodiments, storage 106 includes mass storage for data or instructions. As an example and not by way of limitation, storage 106 may include a hard disk drive (HDD), a floppy disk drive, flash memory, an optical disc, a magneto-optical disc, magnetic tape, or a Universal Serial Bus (USB) drive or a combination of two or more of these. Storage 106 may include removable or non-removable (or fixed) media, where appropriate. Storage 106 may be internal or external to information handling system 100, where appropriate. In particular embodiments, storage 106 is non-volatile, solid-state memory. In particular embodiments, storage 106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 106 taking any suitable physical form. Storage 106 may include one or more storage control units facilitating communication between processor 102 and storage 106, where appropriate. Where appropriate, storage 106 may include one or more storages 106. Although this disclosure describes and illustrates particular storage, this disclosure contemplates any suitable storage.

In particular embodiments, I/O interface 108 includes hardware, software, or both, providing one or more interfaces for communication between information handling system 100 and one or more I/O devices. Information handling system 100 may include one or more of these I/O devices, where appropriate. One or more of these I/O devices may enable communication between a person and information handling system 100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 108 for them. Where appropriate, I/O interface 108 may include one or more device or software drivers enabling processor 102 to drive one or more of these I/O devices. I/O interface 108 may include one or more I/O interfaces 108, where appropriate. Although this disclosure describes and illustrates a particular I/O interface, this disclosure contemplates any suitable I/O interface.

In particular embodiments, communication interface 110 includes hardware, software, or both providing one or more interfaces for communication (such as, for example, packet-based communication) between information handling system 100 and one or more other information handling systems 100 or one or more networks. As an example and not by way of limitation, communication interface 110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 110 for it. As an example and not by way of limitation, information handling system 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Information handling system 100 may include any suitable communication interface 110 for any of these networks, where appropriate. Communication interface 110 may include one or more communication interfaces 110, where appropriate. Although this disclosure describes and illustrates a particular communication interface, this disclosure contemplates any suitable communication interface.

In particular embodiments, bus 112 includes hardware, software, or both coupling components of information handling system 100 to each other. As an example and not by way of limitation, bus 112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 112 may include one or more buses 112, where appropriate. Although this disclosure describes and illustrates a particular bus, this disclosure contemplates any suitable bus or interconnect.

In particular embodiments, information handling system 100 may be a wireless-enabled, portable device that may include one or more processors 102 (e.g., dual core ARM processors), volatile memory 104 (e.g., RAM), non-volatile memory 104 (e.g., flash memory), input/output interfaces 108 (e.g., for display, for data, and for audio), networking/communications interfaces 110, and one or more operating systems (e.g., stored in memory 104 and operated on by processors 102). The input/output interfaces 108 may include display interfaces that support one or more of the Mobile High-Definition Link (MHL) standard, the High Definition Multimedia Interface (HDMI) standard, or the Display Port (DP) standard. The input/output interfaces 108 may also include one or more USB ports (e.g., standard, mini or micro USB), one or more removable memory slots (e.g., SD card slots), and audio capabilities through the MHL, HDMI, or DP interfaces. Information handling system 100 may include networking or communication interfaces 110 that support IEEE 802.11 WLAN protocols (including a, b, g, n, or ac), single or dual band WiFi, BLUETOOTH communication, and near field communication (NFC). Information handling system 100 may include one or more operating systems, including versions of Android, Windows, Wyse ThinOS, Linux, or Apple iOS. Information handling system 100 may include one or more native applications, including, for example, a browser, a media player and recorder, voice over IP and video communication software, and software for remote access to cloud services or other remote content or services. Information handling system 100 may connect through a network to cloud storage sources, as described in more detail with respect to FIG. 2. A user may, for example, use information handling system 100 to securely communicate and/or access files or contents that are on a cloud storage source.

Figure 2:
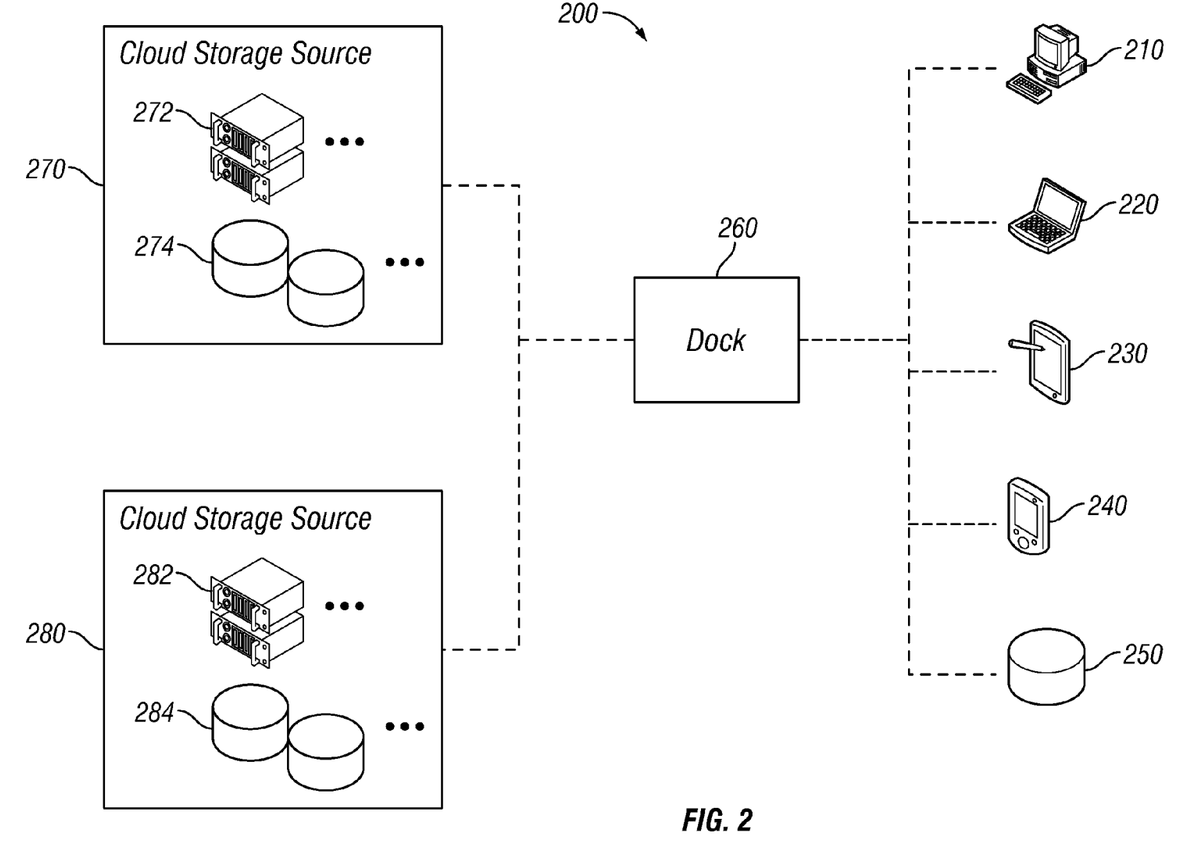
FIG. 2 illustrates an example network environment in which an information handling system may operate with other local or remote devices, in accordance with some embodiments of the present disclosure.

FIG. 2 illustrates an example network environment 200 in which an information handling system may operate with other local or remote devices, in accordance with some embodiments of the present disclosure. In the example of FIG. 2, multiple information handling systems (e.g., devices 210-250) are communicatively coupled (e.g., in any suitable wired or wireless fashion) to dock 260. As an example and not by way of limitation, device 210 may be a desktop computer, device 220 may be a laptop computer, device 230 may be a tablet, device 240 may be a smartphone, and device 250 may be an external storage system. Although this disclosure describes and illustrates particular devices 210-250, this disclosure contemplates any suitable information handling system or device.

Dock 260 may be any suitable type of router or docking station. Dock 260 may include the ability to create a network between devices 210-250. The network may include, for example, an ad hoc network, a personal area network (PAN), a local area network (LAN), a wide area network (WAN), a metropolitan area network (MAN), or one or more portions of the Internet or a combination of two or more of these network types. One or more portions of the network may be wired or wireless. As an example, the network may include portions of a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these.

As shown in FIG. 2, dock 260 may allow devices 210-250 to couple to it and communicate with one or more cloud storage sources 270. Dock 260 may also allow devices coupled to it to communicate with each other. Although not illustrated in FIG. 2, one or more of the devices of network environment 200 may, in particular embodiments, communicate with each other directly (e.g., wirelessly) or via any other suitable communication method. Additionally communications between devices 210-250 and cloud storage source 270 may be encrypted. The data transferred between devices 210-250 and cloud storage source 270 may, for example, be encrypted using standard encryption, proprietary encryption, or a combination of both types.

Cloud storage sources 270 and 280 may be any systems suitable for storing and accessing data over a network. In some embodiments, cloud storage sources 270 and 280 may include a cloud storage service such as Google Drive, DropBox, SkyDrive, SugarSync, Box.com, or any other suitable cloud storage service. In some embodiments, cloud storage sources 270 includes one or more servers 272 and one or more data storage systems 274. Cloud storage source 270 may contain files from multiple devices in a single data structure. Cloud storage source 270 may index the files to allow devices to navigate to the files. Cloud storage source 270 may be used to store data at the direction of a user or may be used to store data at the direction of dock 260. Cloud storage source 270 may provide, for example, access to data, applications, services, or remote desktops. In some embodiments, cloud storage source 270 may be located remote from dock 260. In other embodiments, cloud storage source 270 may be located locally to dock 260. In some embodiments, cloud storage source 270 may be accessed by a device 210-250 when the device 210-250 is connected to dock 260. In other embodiments, cloud storage source 270 may be accessed by a device 210-250 when the device 210-250 is not connected to dock 260. Although this disclosure describes and illustrates two particular cloud storage sources 270 and 280, this disclosure contemplates any suitable cloud storage source and any suitable number of cloud storage sources.

Dock 260 may allow devices 210-250 to automatically dock with dock 260. Prior to an automatic dock with a device, dock 260 may authenticate the device. Dock 260 may also allow devices 210-250 to manually dock with dock 260. Dock 260 may authenticate devices by prompting for a user name and password, via Wired Equivalent Privacy (WEP) security, via Wi-Fi Protected Access (WPA) security, via a smart card, USB token, software token, secure credentials, biometric authentication, multi-layer authentication, or any other suitable authentication method.

As an example and not by way of limitation, in FIG. 2, device 210 may contain a file. In some embodiments, dock 260 detects that device 210 contains a new file when device 210 docks with dock 260. The detection may also include detecting that device 210 contains a previously detected file that has been revised or updated since the file was last detected by dock 260. The types of files detected by dock 260 may be any type of file included on an information handling system including, but not limited to, documents, presentations, email files, audio files, video files, and picture files. In some embodiments, the user of device 210 may specify which types of files dock 260 should automatically detect. In other embodiments, the user of device 210 may specify one or more locations on device 210 where dock 260 may look to detect new files. In yet another embodiment, the user of dock 260 may identify one or more specific files to be detected by dock 260. In some embodiments, the user of a device connected to dock 260 may specify a preferred storage location for any type of file to be stored in system 200. Although this disclosure describes and illustrates a file residing on device 210, a suitable file may reside on devices 220-250 or on any other suitable device.

In some embodiments, dock 260 may select a storage location on a cloud storage source and upload the file to it. In some embodiments, dock 260 may select storage locations on multiple cloud storage sources and upload portions of the file to each storage location. In some embodiments, dock 260 may select a storage location on a local storage source such as device 250. Dock 260 may select the storage location based on a number of factors. For example, dock 260 may calculate a weighted value for cloud storage sources 270 and 280 by evaluating one or more factors, weighting each factor, and summing the weighted factors. In some embodiments, the weighted value for a particular cloud storage source may represent the overall suitability or desirability of that particular cloud storage source as a storage location for the particular file. Thus, a lower weighted value may indicate that a particular cloud storage source is a less suitable or less desirable storage location for the particular file. Also, a higher weighted value may indicate that a particular cloud storage source may be a more suitable or more desirable storage location for the particular file. In such embodiments, dock 260 may select the cloud storage source with the highest weighted value. However, the present disclosure contemplates embodiments in which the weighted value for a particular cloud storage source may represent the overall unsuitability or undesirability of that particular cloud storage source as a storage location for the particular file. In such embodiments dock 260 may select the cloud storage source with the lowest weighted value. In some embodiments, the weight given to each factor may represent the overall importance of that respective factor in determining the suitability or desirability of a particular cloud storage source as a storage location for a particular file. In some embodiments, the weight given to one or more factors is set by the user. In some embodiments, the weight given to one or more factors is set automatically.

In some embodiments, the weighted value for cloud storage source 270 is based on the data turn-around time to cloud storage resource 270. The data turn-around time for cloud storage source 270 is the time that has passed between a request for a file from cloud storage source 270 to dock 260 and when the requested file is received. For example, the data turn-around time may depend on network latency, network bandwidth, network type, or the size of the file. In some embodiments, the weighted value for cloud storage source 270 is based on the last access time associated with the file. For example, when the file has been accessed recently, the weight given to the data turn-around time for cloud storage source 270 may be increased.

In some embodiments, the weighted value for cloud storage source 270 is based on the type of the file and whether cloud storage source 270 meets minimum requirements for that file type. For example, in some embodiments cloud storage source 270 has sufficient bandwidth to dock 260 to supply streaming video. In such an embodiment, the weighted value for cloud storage source 270 may be higher when the file is a video file than when the file is a word-processing document. As another example, in some embodiments cloud storage source has sufficient bandwidth to supply streaming audio but not streaming video. In such an embodiment, the weighted value for cloud storage source 270 may be higher when the file is an audio file than when the file is a video file or a document. As yet another example, in some embodiments a group of related documents may exist, such as a game program and a set of image and multimedia files related to the game. In such an embodiment, the weighted value for cloud storage source 270 may be higher when the file is an image file related to a game already stored on cloud storage source 270 than when it is another type of file.

In some embodiments, the user may supply a meta tag associated with the file and dock 260 may determine meta information associated with cloud storage source 270. In such embodiments, the weighted value for cloud storage source 270 may be based on the correspondence of the meta tag and the meta information. For example, the meta tag may indicate a security level assigned to the file and the meta information may indicate whether cloud storage source 270 stores and transmits files in an encrypted format. In such embodiments, when the file is assigned a security level indicating that encryption is desirable, the weighted value for cloud storage source 270 may be higher when cloud storage source 270 stores and transmits files in an encrypted format than when it does not. When the file is assigned a security level indicating that encryption is not needed, the weighted value for cloud storage source 270 may not vary regardless of whether cloud storage source 270 stores and transmits files in an encrypted format. As another example, the meta tag may indicate whether the file is frequently changed. The meta information may indicate how often cloud storage source 270 automatically backs up files. In such embodiments, when the file is frequently changed, the weighted value for cloud storage source 270 may be higher when it frequently backs up files than when it infrequently backs up files. As another example, the meta tag may indicate whether the file is associated with work, home, school. a community organization, or some other suitable locality. In such embodiments, the user may specify a preferred storage location corresponding to each locality. For example, the user may specify that work files should be stored on cloud storage source 270 and home files should be stored on cloud storage source 280.

In some embodiments, the weighted value for cloud storage source 270 is based on the size of the file and the unused storage capacity of cloud storage source 270. For example, the weighted value may reflect the absolute amount of storage currently unused on cloud storage source 270, minus the size of the file. As another example, the weighted value may reflect the percentage of storage that would remain unused on cloud storage source 270 were the file stored there. In some embodiments, the user may set a high-water mark for cloud storage source 270. The high-water mark may reflect an absolute amount of storage or a percentage of the total storage available on cloud storage source 270. For example, the high-water mark may indicate that no more than ninety-two percent of the storage on cloud storage source 270 should be used. In some embodiments, the weighted value for cloud storage source 270 may decrease exponentially when the storage space used on cloud storage source 270 exceeds the high-water mark. In some embodiments, the weighted value for cloud storage source 270 may be zero when the storage space used on cloud storage source 270 exceeds the high-water mark. In some embodiments, the user may set a high-water mark for multiple cloud storage sources. In some embodiments, the user may set a low-water mark for cloud storage source 270. The low-water mark may reflect an absolute amount of storage or a percentage of the total storage available on cloud storage source 270. For example, the low-water mark may indicate that the weighted value for cloud storage source 270 should be increased when less than ten percent of the storage on cloud storage source 270 has been used. In some embodiments, the increase in the weighted value for cloud storage source 270 when it is below its low-water mark is smaller than the potential increase in the weighted value based on another factor. For example, in some embodiments the increase in the weighted value for cloud storage 270 when it is below its low-water mark is smaller than the potential increase in the weighted value based on a meta tag and meta information, as discussed above. In such embodiments, the weighted value may be highest for a cloud storage source whose meta information corresponds to the meta tag associated with the file, lower for a cloud storage source whose meta information does not correspond with the meta tag but which is below its low-water mark, and lower still for a cloud storage source whose meta information does not correspond and which is at or above its low-water mark.

Although this disclosure describes and illustrates selecting a storage location for the file on cloud storage source 270, this disclosure contemplates selecting a storage location on cloud storage source 280 or on any other suitable cloud storage source.

After the file has been uploaded to cloud storage source 270, dock 260 may provide a pointer to the file to all devices connected to dock 260. The pointer may be located in an appropriate file or directory structure based upon the file type. Dock 260 may also provide a pointer to the file to any device that connects to dock 260 in the future. Dock 260 may detect a new file automatically, upload the file to cloud storage source 270 automatically, and provide the pointer to devices 220-250 automatically. For example, a pointer may be provided to a device by sending the pointer to the device with or without user input.

Each of devices 210-250 may belong to a single user or to multiple users. In some embodiments, any device which has been authenticated by dock 260 may connect to dock 260 and dock 260 may upload files from the device and may allocate pointers to the device. Each of devices 210-250 may include a software application configured to allow for interaction with dock 260 and/or cloud storage sources 270. Devices 210-250 may be the same platform or different platforms including, but not limited to, Apple iOS, Microsoft Windows, Android, Wyse ThinOS, or Linux.

In some embodiments, dock 260 may provide dynamic load-balancing between cloud storage sources 270 and 280. For example, dock 260 may periodically recalculate the weighted value for each cloud storage source with regard to a particular file. Dock 260 may then select a new storage location based on the weighted values, then move the file there by copying the particular file to the new storage location and removing it from the old storage location. As an example and not by way of limitation, cloud storage source 270 and cloud storage source 280 may be above the high-water mark set by the user, as discussed above. If the user then deletes a large file that had been stored on cloud storage source 280, the user may cause cloud storage source 280 to drop well below its high water mark. In that case, as discussed above, the weighted value for cloud storage source 280 may increase, and dock 260 may move a file from cloud storage source 270 to cloud storage source 280 to bring cloud storage source 270 below its high water mark as well.

In some embodiments, a user of dock 260 may cause dock 206 to perform dynamic load-balancing at a predetermined time. For example, dock 260 may perform dynamic load-balancing at a particular time of day or on a particular day of the week. As another example, dock 260 may perform dynamic load-balancing after a particular interval of time has elapsed.

In some embodiments, dock 260 may monitor the amount of storage used on a given cloud storage source. For example, in some embodiments dock 260 may detect during its periodic load-balancing that the amount of storage used on cloud storage source 270 exceeds the high-water mark set for cloud storage source 270. In such an embodiment, dock 260 may alert the user that more space is needed on cloud storage source 270. Similarly, in some embodiments, dock 260 may detect during its periodic load-balancing that the amount of storage used on external storage system 250 is approaching the capacity of external storage system 250. In such an embodiment, dock 260 may alert the user that additional disks should be added to external storage system 250.

Figure 3:
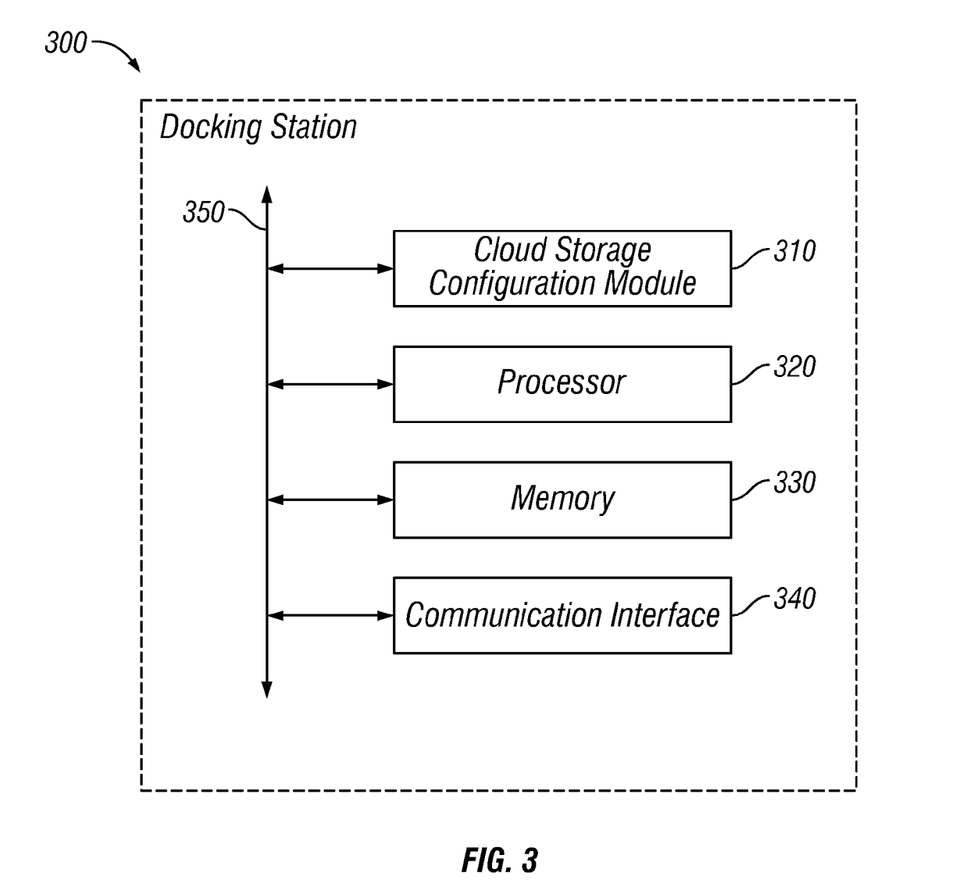
FIG. 3 illustrates a block diagram of selected elements of an embodiment of a docking station, in accordance with some embodiments of the present disclosure.

FIG. 3 illustrates a block diagram of selected elements of an embodiment of a docking station 300, in accordance with some embodiments of the present disclosure. In particular embodiments, one or more docking stations 300 may perform one or more steps of one or more methods described or illustrated herein. In particular embodiments, one or more docking stations 300 provide the functionality described or illustrated herein. In particular embodiments, software running on one or more docking stations 300 performs one or more steps of one or more methods described or illustrated herein or provides functionality described or illustrated herein. Particular embodiments include one or more portions of one or more docking stations 300. Moreover, reference to a docking station may encompass one or more docking stations, where appropriate.

Where appropriate, one or more docking stations 300 may perform without substantial spatial or temporal limitation one or more steps of one or more methods described or illustrated herein. As an example and not by way of limitation, one or more docking stations 300 may perform in real time or in batch mode one or more steps of one or more methods described or illustrated herein. One or more docking stations 300 may perform at different times or at different locations one or more steps of one or more methods described or illustrated herein, where appropriate.

In some embodiments, docking station 300 includes cloud storage management module 310, processor 320, memory 330, input/output (I/O) interface 340, and bus 350. Although this disclosure describes and illustrates a particular docking station having a particular number of particular components in a particular arrangement, this disclosure contemplates any suitable docking station having any suitable number of any suitable components in any suitable arrangement.

In particular embodiments, cloud storage management module 310 includes hardware for executing instructions, such as those making up a computer program. As an example and not by way of limitation, to execute instructions, cloud storage management module 310 may retrieve (or fetch) the instructions from memory 330, decode and execute them, and then write one or more results to an internal register, an internal cache, or memory 330. Cloud storage management module 310 may also execute instructions on processor 320. Cloud storage management module 310 may execute instructions that may cause docking station 300 to detect a file on a device and upload the file to a cloud storage source. Cloud storage management module 310 may also execute instructions that may cause docking station 300 to provide a pointer to one or more connected devices. Cloud storage management module 310 may be similar to processor 102 as described with reference to FIG. 1. This disclosure contemplates cloud storage management module 310 taking any suitable physical form. Where appropriate, cloud storage management module 310 may include one or more cloud storage management modules 310. Although this disclosure describes and illustrates a particular cloud storage management module, this disclosure contemplates any suitable module.

In particular embodiments, processor 320 includes hardware for executing instructions, such as those making up a computer program. As an example and not by way of limitation, to execute instructions, processor 320 may retrieve (or fetch) the instructions from an internal register, an internal cache, or memory 330; decode and execute them; and then write one or more results to an internal register, an internal cache, or memory 330. Processor 320 may be a similar processor to processor 102 as described with reference to FIG. 1. Although this disclosure describes and illustrates a particular processor, this disclosure contemplates any suitable processor.

In particular embodiments, memory 330 includes main memory for storing instructions for cloud storage management module 310 or processor 320 to execute or data for cloud storage management module 310 or processor 340 to operate on. Memory 330 may be similar to memory 104 as described with reference to FIG. 1. Memory 330 may include one or more memories 330, where appropriate. Although this disclosure describes and illustrates particular memory 330, this disclosure contemplates any suitable memory.

In particular embodiments, communication interface 340 includes hardware, software, or both providing one or more interfaces for communication (such as, for example, packet-based communication) between docking station 300 and one or more other docking stations 300, one or more devices, or one or more cloud storage systems. Communication interface 340 may be similar to communication interface 110 as described with reference to FIG. 1. Communication interface 340 may include one or more communication interfaces 340, where appropriate. Although this disclosure describes and illustrates a particular communication interface, this disclosure contemplates any suitable communication interface.

In particular embodiments, bus 350 includes hardware, software, or both coupling components of docking station 300 to each other. Bus 350 may be any suitable bus, such as any bus 112 as described with reference to FIG. 1. Bus 350 may include one or more buses 350, where appropriate. Although this disclosure describes and illustrates a particular bus, this disclosure contemplates any suitable bus or input/output (I/O) interconnect.

In particular embodiments, docking station 300 may include one or more native applications, including, for example, software for providing access to cloud services, software for managing users and device access to docking station 300, or software for managing features of a router. Docking station 300 may connect through to a cloud services system and may connect to other devices, as described in FIG. 2.

Figure 4:
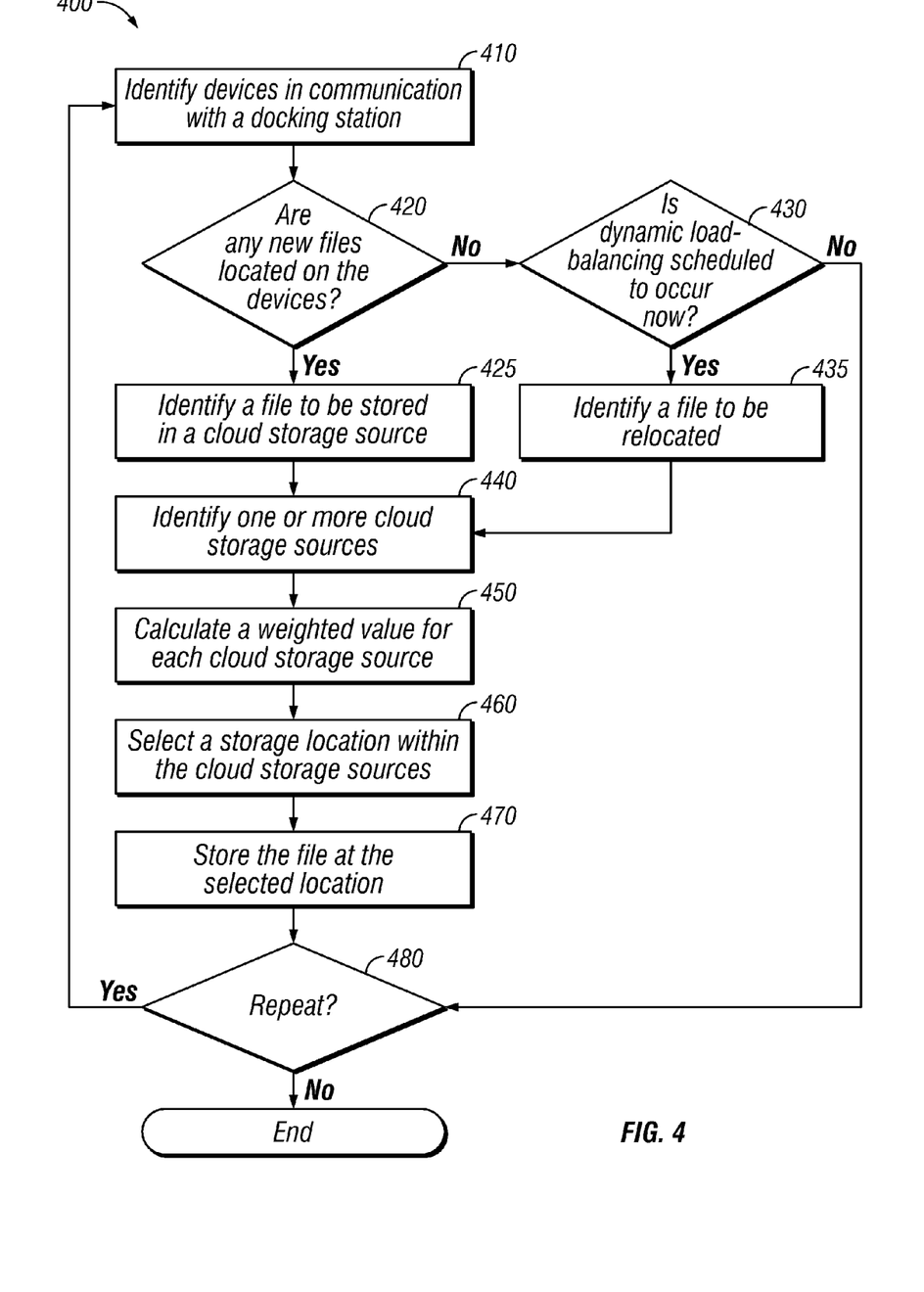
FIG. 4 illustrates an example method for virtualizing and managing cloud storage sources, in accordance with some embodiments of the present disclosure.

FIG. 4 illustrates an example method 400 for virtualizing and managing cloud storage sources, in accordance with some embodiments of the present disclosure. The method may begin at step 410, where the cloud storage management module may identify devices in communication with the docking station.

In step 420, the cloud storage management module may determine whether any new files are stored on the devices in communication with the docking station. If any new files exist, method 400 proceeds to step 425.

In step 425, the cloud storage management module may identify a file to be stored in a cloud storage source. In some embodiments, the file is located on one of the devices in communication with the docking station. The file may be of any type suitable for storage on a cloud storage source, such as documents, presentations, email files, audio files, video files, image files, or other suitable files. The term "file" may also refer to any discrete container of content including memory or a variety of other data structures or mechanisms that may be used to store information. Method 400 then proceeds to step 440.

If the cloud storage management module determines in step 420 that no new files are stored on the devices in communication with the docking station, method 400 proceeds to step 430. In step 430, the cloud management module may determine whether dynamic load-balancing is scheduled to occur now. For example, the cloud storage management module may perform dynamic load-balancing at a predetermined time, such as a particular time of day, a particular day of the week, or after a particular interval of time. If dynamic load-balancing is not scheduled to occur now, method 400 proceeds to step 480.

If the cloud storage management module determines in step 430 that dynamic load-balancing is scheduled to occur now, method 400 proceeds to step 435. In step 435, the cloud management module may identify a file to be relocated. For example, the file may be a file already stored on a cloud storage source. In some embodiments, the file is a file previously stored on a cloud storage source by the cloud storage management module. In some embodiments, the file is a file previously stored on a cloud storage source by a user. As discussed above in connection with step 425, the file may be of any type suitable for storage on a cloud storage source, such as documents, presentations, email files, audio files, video files, image files, or other suitable files. The term "file" may also refer to any discrete container of content including memory or a variety of other data structures or mechanisms that may be used to store information. Method 400 then proceeds to step 440.

In step 440, the cloud storage management module may identify one or more cloud storage sources. For example, the cloud storage management module may identify cloud storage sources 270 and 280, discussed with reference to FIG. 2.

In step 450, the cloud storage management module may calculate a weighted value for each storage source identified in step 420. As discussed in more detail above with reference to FIG. 2, the weighted value for a particular cloud storage source may be based on a number of factors. For example, in some embodiments the weighted value is based on the data turn-around time from the dock to the cloud storage source. In some embodiments, the weighted value is based on the last access time of the file. In some embodiments, the weighted value is based on the type of the file. In some embodiments, the weighted value is based on the size of the file and the unused storage capacity of the cloud storage source. In some embodiments, the weighted value is based on a high-water mark set by the user. In some embodiments, the weighted value is based on the correspondence between a meta tag associated with the file and meta information associated with the cloud storage source.

In step 460, the cloud storage management module may select a storage location within the cloud storage sources identified in step 420. The dock may select the storage location based on the weighted value for each cloud storage source. For example, in some embodiments the dock may select the cloud storage source with the highest weighted value. In some embodiments the dock may select the cloud storage source with the lowest weighted value. In some embodiments, the dock may select a storage location including multiple cloud storage sources.

In step 470, the cloud storage management module may store the file at the storage location selected in step 440. For example, the dock may copy the file to a single cloud storage source selected in step 440. In embodiments where the dock selects, in step 440, a storage location including multiple cloud storage sources, the dock may store only a portion of the file on each of the cloud storage sources included in the storage location. If the file was identified in step 420 as a file on a device in communication with the docking station, the cloud storage source may also provide a pointer to the storage location to the device. If the file was identified in step 430 as a file to be relocated, the cloud storage source may also remove the file from its old location.

In step 480, the cloud storage management module may determine whether to repeat steps 410 to 470. For example, the cloud storage management module may repeat steps 410 to 470 until no new files are located at step 420. As another example, the cloud storage management module may repeatedly perform dynamic load-balancing at a predetermined time, such as a particular time of day, a particular day of the week, or after a particular interval of time. As yet another example, the cloud storage management module may repeat steps 410 to 470 whenever a new device is docked. If the dock determines to repeat steps 410 to 470, method 400 returns to step 410. If the dock determines not to repeat steps 410 to 470, method 400 ends.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for virtualizing and managing cloud storage sources including the particular steps of the method of FIG. 4, this disclosure contemplates any suitable method for virtualizing and managing cloud storage sources including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4. For example, some steps of FIG. 4 may be performed by information handing system 100 while other steps of FIG. 4 are performed by dock 300.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method of utilizing cloud storage sources via a docking station, comprising:
    the docking station determining that a first device has been docked with the docking station;
    after the first device has been docked with the docking station, the docking station determining that a new file has been stored on the first device;
    based at least on the docking station determining that the new file has been stored, the docking station storing, via a network, the new file on a cloud storage service, including:
        the docking station identifying, via the network, a plurality of cloud storage services that includes the cloud storage service; and
        the docking station calculating a weighted value of each cloud storage service of the plurality of cloud storage services, including:
            the docking station receiving, from a user, a meta tag indicating a security level associated with the new file; and
            the docking station determining meta information associated with each cloud storage service of the plurality of cloud storage services, the meta information indicating whether cloud storage service is capable of storing and transmitting files in an encrypted format, wherein the weighted value of each cloud storage service is based at least on a correspondence between the meta tag and the meta information associated with each respective cloud storage service;
    the docking station selecting a storage location within the plurality of cloud storage services based at least on the calculated weighted values;
    the docking station storing, via the network, the new file at the selected storage location; and
    the docking station providing a pointer to the new file to a second device, either currently docked with the docking station or docked with the docking station at a future time.

2. The method of claim 1, further comprising:
    the docking station determining a data turn-around time of each cloud storage service of the plurality of cloud storage services, wherein the weighted value of each cloud storage service is further based at least on the data turn-around time of each respective cloud storage service.

3. The method of claim 2, further comprising:
    the docking station calculating a data turn-around time weight factor based at least on the determined data turn-around time for each respective cloud storage service;
    the docking station determining a last access time associated with the new file; and
    based at least on the last access time associated with the new file, the docking station adjusting the data turn-around time weight factor for each respective cloud storage service;
    wherein the weighted value of each cloud storage service is further based at least on the data turn-around time weight factor.

4. The method of claim 1, further comprising:
    the docking station determining a size of the new file; and the docking station determining an unused storage capacity of each cloud storage service of the plurality of cloud storage services;
wherein the weighted value of each cloud storage service is further based at least on the unused storage capacity of each respective cloud storage service and the size of the new file.

5. The method of claim 1, further comprising:
the docking station determining a file type of the new file; and
the docking station determining whether each cloud storage service of the plurality of cloud storage services meets minimum requirements for the file type;
wherein the weighted value of each cloud storage service is further based on whether the respective cloud storage service meets the minimum requirements for the file type.

6. The method of claim 1, wherein:
the docking station selecting the storage location comprises selecting the set of cloud storage services from the plurality of cloud storage services; and
the docking station storing the new file at the selected storage location comprises storing only a portion of the new file at each cloud storage service in the set.

7. A non-transitory computer readable medium, comprising computer readable instructions which, when executed by a processor of a docking station, cause the docking station to:
determine that a first device has been docked with the docking station;
after determining that the first device has been docked with the docking station, determine that a new file has been stored on the first device;
based at least on determining that the new file has been stored, store, via a network, the new file on a cloud storage service, wherein, to store the new file on the cloud storage service, the computer readable instructions further cause the docking station to:
identify, via the network, a plurality of cloud storage services that includes the cloud storage service;
calculate a weighted value of each cloud storage service of the plurality of cloud storage services, wherein, to calculate the weighted value of each cloud storage service, the computer readable instructions further cause the docking station to:
receive, from a user, a meta tag indicating a security level associated with the new file; and
determine meta information associated with each cloud storage service of the plurality of cloud storage services, the meta information indicating whether cloud storage service is capable of storing and transmitting files in an encrypted format, wherein the weighted value of each cloud storage service is based at least on a correspondence between the meta tag and the meta information associated with each respective cloud storage service;
select a storage location within the plurality of cloud storage services based at least on the calculated weighted values;
store, via the network, the new file at the selected storage location; and
provide a pointer to the new file to a second device, either currently docked with the docking station or docked with the docking station at a future time.

8. The non-transitory computer readable medium of claim 7, the computer readable instructions further cause the docking station to determine a data turn-around time of each cloud storage service of the plurality of cloud storage services, wherein the weighted value of each cloud storage service is further based at least on the data turn-around time of each respective cloud storage service.

9. The non-transitory computer readable medium of claim 8, the computer readable instructions further cause the docking station to:
calculate a data turn-around time weight factor based at least on the determined data turn-around time for each respective cloud storage service;
determine a last access time associated with the new file; and
based at least on the last access time associated with the new file, adjust the data turn-around time weight factor for each respective cloud storage service;
wherein the weighted value of each cloud storage service is further based at least on the data turn-around time weight factor.

10. The non-transitory computer readable medium of claim 7, the computer readable instructions further cause the docking station to:
determine a size of the new file; and
determine an unused storage capacity of each cloud storage service of the plurality of cloud storage services;
wherein the weighted value of each cloud storage service is further based at least on the unused storage capacity of each respective cloud storage service and the size of the new file.

11. The non-transitory computer readable medium of claim 7, the computer readable instructions further cause the docking station to:
determine a file type of the new file; and
determine whether each cloud storage service among the plurality of cloud storage services meets minimum requirements for the file type;
wherein the weighted value of each cloud storage service is further based on whether the respective cloud storage service meets the minimum requirements for the file type.

12. The non-transitory computer readable medium of claim 7,
wherein, to select the storage location, the computer readable instructions further cause the docking station to:
select a set of cloud storage services from the plurality of cloud storage services; and
wherein, to store the new file at the selected storage location, the computer readable instructions further cause the docking station to:
store only a portion of the new file at each cloud storage service in the set of cloud storage services.

13. A docking station, comprising:
a processor; and
a memory communicatively coupled to the processor;
wherein the memory includes instructions which, when executed by the processor, cause the docking station to:
determine that a first device has been docked with the docking station;
after determining that the first device has been docked with the docking station, determine that a new file has been stored on the first device; and
based at least on determining that the new file has been stored, store, via a network, the new file on a cloud storage service, wherein, to store the new file on the cloud storage service, the instructions further cause the docking station to:
identify, via the network, a plurality of cloud storage services that includes the cloud storage service;
calculate a weighted value of each cloud storage service of the plurality of cloud storage services, wherein, to calculate the weighted value of each cloud storage service, the instructions further cause the docking station to:
receive, from a user, a meta tag indicating a security level associated with the new file; and
determine meta information associated with each cloud storage service of the plurality of cloud storage services, the meta information indicating whether cloud storage service is capable of storing and transmitting files in an encrypted format, wherein the weighted value of each cloud storage service is based at least on a correspondence between the meta tag and the meta information associated with each respective cloud storage service;
select a storage location within the plurality of cloud storage services based at least on the calculated weighted values;
store, via the network, the new file at the selected storage location; and
provide a pointer to the new file to a second device, either currently docked with the docking station or docked with the docking station at a future time.

14. The docking station of claim 13, the instructions further cause the docking station to determine a data turn-around time of each cloud storage service of the plurality of cloud storage services, wherein the weighted value of each cloud storage service is further based at least on the data turn-around time of each respective cloud storage service.

15. The docking station of claim 14, the instructions further cause the docking station to:
calculate a data turn-around time weight factor based at least on the determined data turn-around time for each respective cloud storage service;
determine a last access time associated with the new file; and
based at least on the last access time associated with the new file, adjust the data turn-around time weight factor for each respective cloud storage service;
wherein the weighted value of each cloud storage service is further based at least on the data turn-around time weight factor.

16. The docking station of claim 13, the instructions further cause the docking station to:
determine a size of the new file; and
determine an unused storage capacity of a first cloud storage service of the plurality of cloud storage services;
wherein the weighted value of the first cloud storage service is further based at least on the unused storage capacity of the first cloud storage service and the size of the new file.

17. The docking station of claim 13, the instructions further cause the docking station to:
determine a file type of the new file;
determine whether each cloud storage service of the plurality of cloud storage services meets minimum requirements for the file type;
wherein the weighted value of each cloud storage service is further based at least on whether the respective cloud storage service meets the minimum requirements for the file type.

18. The docking station of claim 13,
wherein, to select the storage location, the instructions further cause the docking station to select a set of cloud storage services from the plurality of cloud storage services; and
wherein, to store the new file at the selected storage location, the instructions further cause the docking station to store only a portion of the new file at each cloud storage service in the set.

* * * * *